(12) United States Patent
Wang et al.

(10) Patent No.: US 7,027,686 B1
(45) Date of Patent: Apr. 11, 2006

(54) PARAMETER TOLERANT SPLITTER/COMBINER WITH SUBDIVIDED COUPLERS

(75) Inventors: Tairan Wang, Brighton, MA (US); Gökhan Ulu, Roslindale, MA (US)

(73) Assignee: Cambrius, Inc., Waltham, MA (US)

( * ) Notice: Subject to any disclaimer, the term of this patent is extended or adjusted under 35 U.S.C. 154(b) by 0 days.

(21) Appl. No.: 10/290,875

(22) Filed: Nov. 8, 2002

Related U.S. Application Data

(63) Continuation-in-part of application No. 10/093,663, filed on Mar. 8, 2002.

(51) Int. Cl.
*G02B 6/26* (2006.01)
*G02B 6/42* (2006.01)

(52) U.S. Cl. .............. 385/27; 385/24; 385/39

(58) Field of Classification Search .......... 385/27, 385/2, 12, 39, 40, 42, 129, 130, 24; 356/350
See application file for complete search history.

(56) References Cited

U.S. PATENT DOCUMENTS

| | | | |
|---|---|---|---|
| 5,044,715 A | 9/1991 | Kawachi et al. | |
| 5,119,453 A | 6/1992 | Gonthier et al. | |
| 5,162,869 A * | 11/1992 | Michel et al. | 356/477 |
| 5,943,457 A | 8/1999 | Hayward et al. | |
| 6,208,780 B1 * | 3/2001 | Li et al. | 385/27 |
| 6,212,315 B1 * | 4/2001 | Doerr | 385/39 |
| 6,285,810 B1 * | 9/2001 | Fincato et al. | 385/24 |
| 6,400,870 B1 * | 6/2002 | Hill et al. | 385/39 |
| 6,633,698 B1 * | 10/2003 | Hatayama et al. | 385/27 |
| 2003/0002797 A1 * | 1/2003 | Chu et al. | 385/39 |
| 2003/0063834 A1 * | 4/2003 | Godbout et al. | 385/40 |
| 2004/0052441 A1 * | 3/2004 | Doerr | 385/3 |

FOREIGN PATENT DOCUMENTS

JP 2003-21814 A * 1/2003

OTHER PUBLICATIONS

"Design Rules for Maximally Flat Wavelength-Insensitive Optical Power Dividers Using Mach-Zehnder Structures," Little et al. IEEE Photonics Technology Letters. Dec. 1997. vol. 9, No. 12.

* cited by examiner

*Primary Examiner*—Jared J. Fureman
(74) *Attorney, Agent, or Firm*—Gauthier & Connors

(57) ABSTRACT

A splitter/combiner system including directional couplers and phase shifts where some of the directional couplers are subdivided into shorter directional couplers, with 0° phase shifts between them. The system provides improved ease of design, and uniformity. The subdivided couplers also provide more accurate ratios between all the couplers in the splitter/combiner.

9 Claims, 5 Drawing Sheets

US 7,027,686 B1

PARAMETER TOLERANT SPLITTER/COMBINER WITH SUBDIVIDED COUPLERS

PRIORITY INFORMATION

This application is a continuation-in-part application of Ser. No. 10/093,663 filed Mar. 8, 2002.

BACKGROUND OF THE INVENTION

Power splitters/combiners are essential components in optical systems, and especially in integrated planar waveguide systems. U.S. patent application Ser. No. 10/093,663 describes a splitter/combiner system with improved tolerance to parameter deviations. In this power splitter/combiner system, each splitter/combiner is comprised of two or more directional couplers serially connected to two or more phase shifts in an alternating order (e.g., directional coupler, phase shift, directional coupler, phase shift, directional coupler). The specific coupling and phase values for the directional couplers and phase shifts are selected to minimize changes in an output signal in response to changes in the coupling coefficients and the propagation constants, for example.

In one embodiment, a parameter tolerant 50/50 splitter/combiner is provided for an external system having frequency dependent transmission and reflection properties.

SUMMARY OF THE INVENTION

In accordance with exemplary embodiments of the invention, there is provided a splitter/combiner system comprising directional couplers and phase shifts where some of the directional couplers are subdivided into shorter directional couplers, with 0° phase shifts between them. This embodiment provides improved ease of design, and uniformity. The subdivided couplers also provide more accurate ratios between all the couplers in the splitter/combiner.

In another exemplary embodiment of the invention, a splitter/combiner system, comprising two 50/50 splitter/combiners, is coupled to an external system with transmission and reflection properties. The 50/50 splitter/combiners are formed by coupling a 50% coupler to a 100% coupler by a first phase shift. An identical second phase shift is also coupled to the 100% coupler. Identical phase shifts are located between the 50% coupler and the 100% coupler and after the 100% coupler. The 50% coupler comprises a single directional coupler and the 100% coupler is subdivided into two identical directional couplers. All three directional couplers are 50% directional couplers. A 0° phase shift is located between the directional couplers comprising the 100% coupler.

In another exemplary embodiment comprising a sequence of directional couplers and phase shifts, several directional couplers, with different coupling values, are subdivided into smaller identical directional couplers, with 0° phase shifts between them.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention.

DETAILED DESCRIPTION OF THE INVENTION

This invention describes a splitter/combiner system that, when coupled to an external system having a reflection and/or transmission response, has a high level of tolerance to parameter deviations for the desired spectra of the output signal.

Figure 1:
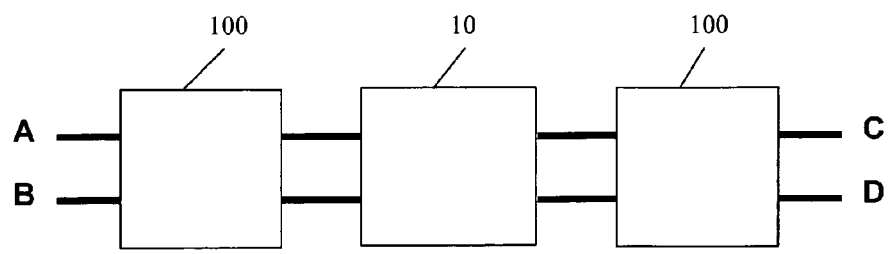
FIG. 1 is a block diagram of a splitter/combiner coupled to an external system having a reflection and transmission spectrum, in accordance with the invention.

FIG. 1 illustrates the typical application for the invention. FIG. 1 is a block diagram of one or more of splitter/combiners 100 coupled to an external system 10 that has reflection ($R(\omega)$) and transmission ($T(\omega)$) spectra.

In this exemplary embodiment, the splitter/combiners 100 are monolithically fabricated from planar waveguides in a high index contrast material system. That is, the material system provides an index contrast between the refractive indices of the waveguides and the cladding that is greater than 1%, or preferably a higher contrast of greater than 2%. Presently, a silicon oxy-nitride system is used in which the refractive index of the waveguides is 1.60 and the refractive index of the cladding layers is about 1.44. Thus, $\Delta n/n_{cladding}$ is greater than about 10%.

The external system 10 is usually comprised of one or more devices, such as, but not limited to, waveguides, filters, and amplifiers. The splitter/combiner system can include one or more splitter/combiners 100 that are coupled to the external system 10. As a result of increasing the tolerance of the splitter/combiner systems 100, the performance and/or yield of the entire system is improved.

Figure 2:
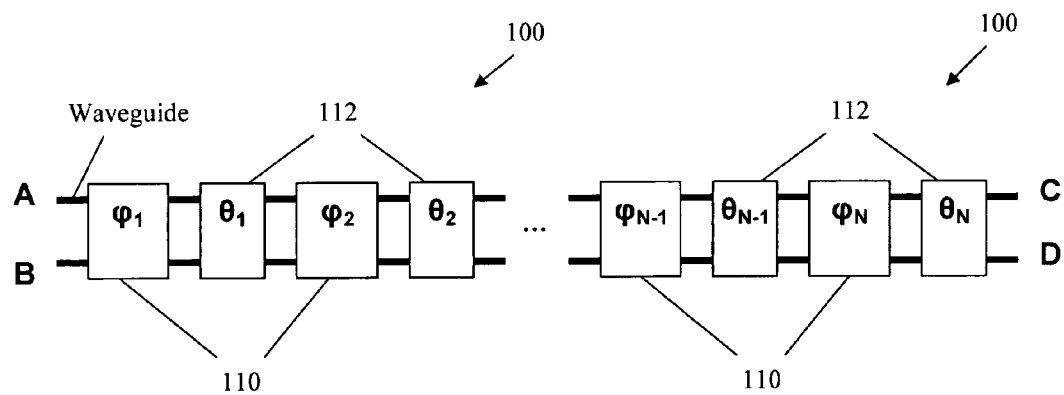
FIG. 2 is a plan view of the generalized configuration of the directional couplers and phase shifts in accordance with the invention.

FIG. 2 is a plan view of the generalized configuration of the directional couplers and phase shifts in accordance with the invention. FIG. 2 shows the general design of the splitter/combiners 100 of FIG. 1. Each splitter/combiner 100 is preferably comprised of two or more directional couplers 110 and two or more phase shifts 112.

The coupling value, $\phi$, of each directional coupler 110 and the phase value, $\theta$, of each phase shift 112 are chosen so that the output signals of interest have a desired power splitting ratio and a high tolerance to a particular type, or types, of parameter deviation.

Various mathematical criteria are used in designing a high parameter tolerance for the spectra of interest, such as designing for maximal flatness of the spectrum with respect to the changes in the parameters and designing for equal-ripple of the spectrum for the desired ranges of the values for the parameters. In designing for maximal flatness, the derivatives of the signal of interest with respect to the parameters of interest are engineered to be preferably negligible. In designing for equal ripple, the deviation of the spectrum of interest, from the ideal spectrum, is engineered to be within the desired tolerance for the desired parameter range. Combinations of spectra of interest, such as the reflection spectrum, the transmission spectrum, or simultaneously both the reflection and transmission spectra, can be designed for high parameter tolerance.

Figure 3:
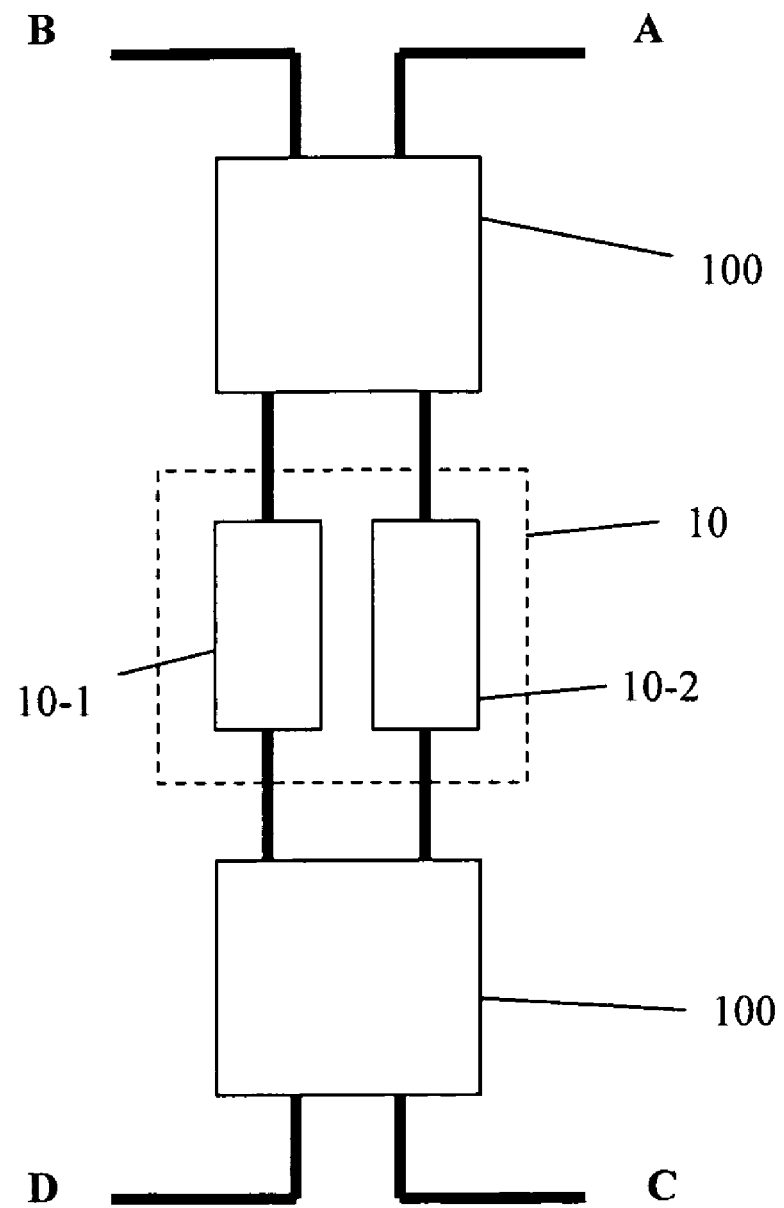
FIG. 3 is a block diagram of a splitter/combiner system coupled to two external optical systems (sub-elements) having the same reflection and transmission spectra, in accordance with the invention.

In accordance with the invention, a splitter/combiner system is designed for high parameter tolerance reflection and transmission spectra. FIG. 3 shows two splitter/combiners 100 coupled to an external system 10, such as a directional-coupler assisted add/drop filter having reflection and transmission spectra, as described, for example, in U.S. patent application Ser. No. 10/096,616, entitled "Directional-coupler Assisted Add/Drop Filter With Induced On/Off Switching and Modulation" filed Mar. 7, 2002 by common assignee, which is incorporated herein by this reference in its entirety. The DCA filter resonator-system is reflective at particular frequencies and transmissive at others. The splitter/combiners 100 have 50/50 power splitting ratios and couple to two DCA filter resonator sub-elements 10-1, 10-2.

Figure 4:
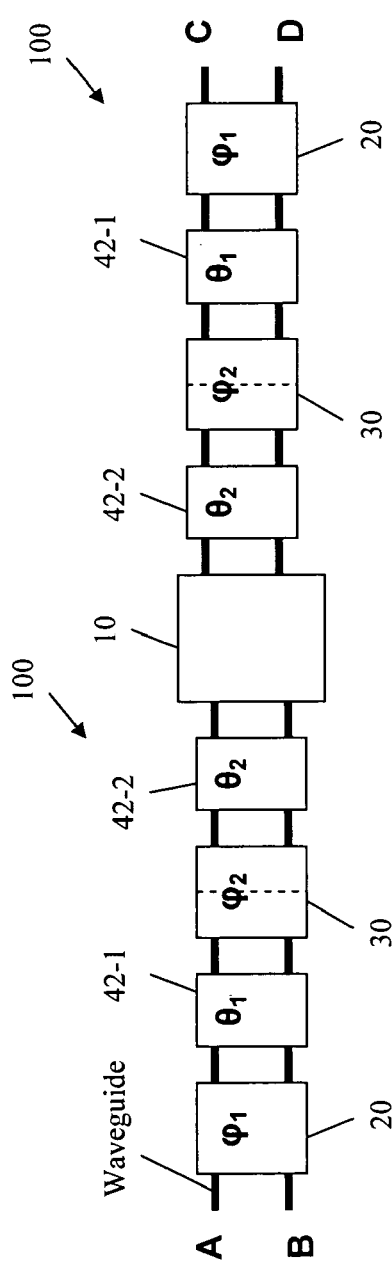
FIG. 4 is a plan view of two exemplary 50/50 splitter/combiners coupled to an external system, in accordance with the invention.

In this embodiment, the splitter/combiners 100 are comprised of couplers 20, 30 and phase shifts 42-1, 42-2, as shown in FIG. 4. The coupling coefficients of the couplers are engineered for a matched deviation, and the propagation constants of the phase shifts are engineered for a matched deviation. Also, in this embodiment, one splitter/combiner 100 is designed for reflection and then mirrored for transmission. The splitter/combiners have an input A and three outputs B, C, and D. In this embodiment, the first output signal C and the reflection of the input signal A are preferably negligible so that there is no crosstalk and no leakage. At the transmissive frequencies, the input A signal is coupled preferably to output D, and at the reflective frequencies the input signal A is coupled preferably to output B. By symmetry, C can also be used as a second input with D and B as outputs.

To achieve high tolerance to common deviations in the coupling coefficients and the propagation constants in this embodiment, the derivatives of the first output signal C and the reflection of the input signal A, with respect to these parameters, are preferably negligible. Using these criteria, one set of solutions for the coupling ratios and the phase shifts is $$\phi_1 = \left(\frac{2n+1}{4}\right)\pi$$

$$\phi_2 = \left(\frac{2m+1}{2}\right)\pi$$

$$\theta_1 = 2q\pi \pm \cos^{-1}\left(-\frac{2n+1}{4m+2}\right)$$

$$\theta_2 = \theta_1$$

where n, m are non-negative integers, 2n+1<4 m+2 and q is any integer.

Since a valid, and simple, solution of the coupling ratios is provided by n=m, resulting in $\phi_2=2\phi_1$, accurate values of n and m are not required. Although, the phase shifts also depend on n and m, waveguide tuning is provided, such as by an electro-optic or thermo-optic refractive index effect, so that the exact values of the phase shifts can be adjusted in a post-fabrication step. Therefore, the overall 50/50 splitter/combiner 100 operation can be achieved with couplers having a 1:2 ratio, which allows for much greater fabrication tolerance.

As described in the parent application, in a simple solution of the coupling ratios and phase shifts, the first coupler 20 is a 50% coupler and the second coupler 30 is a 100% coupler. The first and second phase shifts 42-1, 42-2 are preferably both $$+\frac{2\pi}{3}$$

or both $$-\frac{2\pi}{3}.$$

Figure 5:
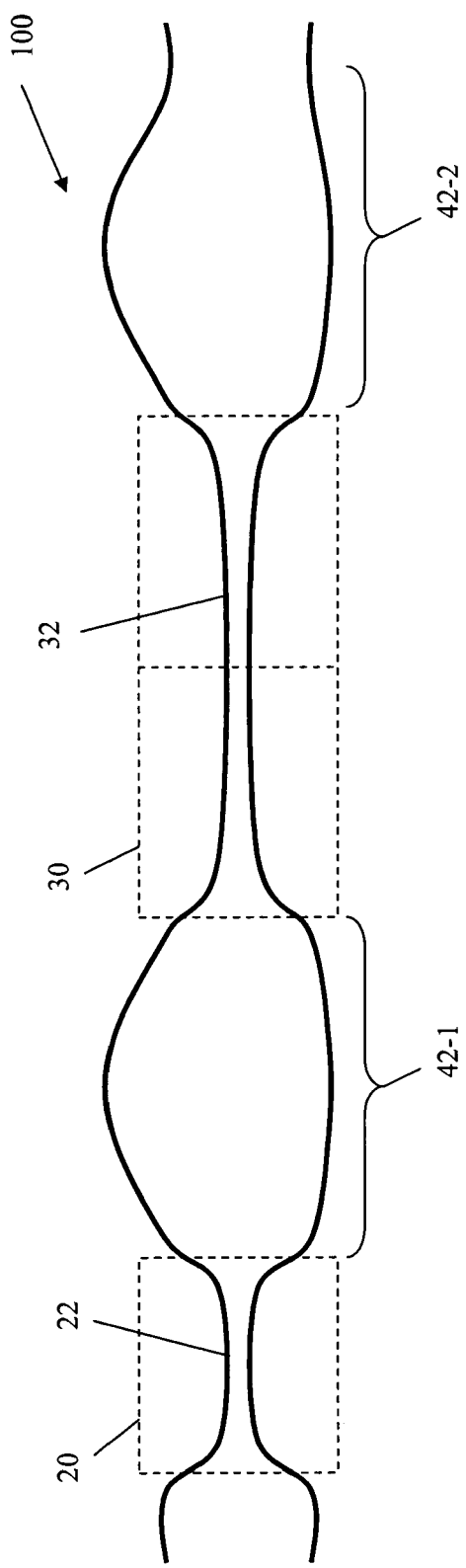
FIG. 5 is a plan view of a 50/50 splitter combiner comprising 50% directional coupler coupled to a first phase shift coupled to a 100% directional coupler coupled to a second phase shift, in accordance with the invention.

In the parent application, a 50% directional coupler 22 and a 100% directional coupler 32 are used, as shown in FIG. 5.

The couplers can also be sub-divided into equivalent sections that contribute equally to the coupling. In FIG. 4 and FIG. 5, each 100% coupler 30 can be subdivided into two equivalent 50% sections, as shown by the dotted lines in the 100% couplers 30.

Figure 6:
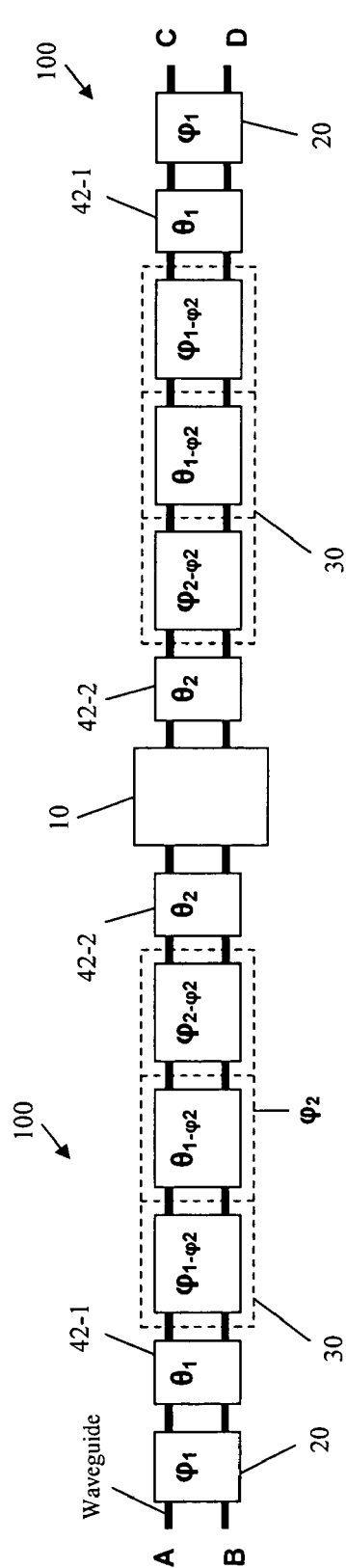
FIG. 6 is a plan view of the 50/50 splitter/combiners coupled an external system shown in FIG. 4 with the 100% coupler subdivided.
Figure 7:
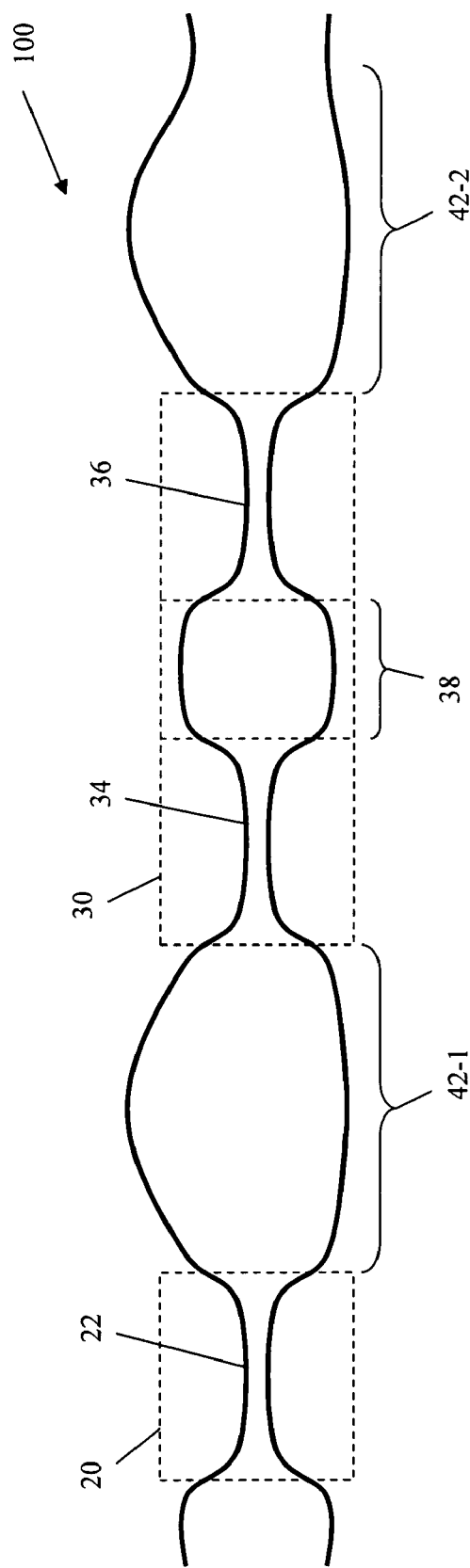
FIG. 7 is a plan view of the 50/50 splitter/combiner shown in FIG. 5 with the 100% directional coupler subdivided and separated by a 0° phase shift.

In this exemplary embodiment, each 100% coupler 30 is subdivided into two identical and smaller couplers with a 0° phase shift placed between them, as shown in FIG. 6 and FIG. 7. The subdivided 100% coupler 30 is configured as two 50% directional couplers 34, 36 with a 0° phase shift 38 between them, as shown in FIG. 7, but still operates the same as the 100% directional coupler 30 in this embodiment. The 0° phase shift is any net phase shift of 0° and can be defined as 2kπ where k is an integer. Typically a 0° phase shift is implemented by using equal arm waveguide lengths.

Consequently, the layout of each splitter/combiner 100 forms a series of three identical directional couplers 22, 34, 36 that operate as the 50%:100% splitter/combiner 100. The directional couplers 22, 34, 36 are all 50%, the first phase shift 42-1 is $$+\frac{2\pi}{3},$$

the second phase shift 38 is 0°, and the third phase shift 42-2 is $$+\frac{2\pi}{3}.$$

This configuration reduces the amount of design because only a 50% directional coupler must be optimized, such as for waveguide bend coupling, and then replicated for the three directional couplers. Because the directional couplers are the same, the matched parameter deviations, such as the coupling coefficient deviations, will be manifested as the same variation in the coupling values for all three directional couplers. Also, as described in the parent application, the post-fabrication tuning of the phase shifts 38, 42-1, 42-2, provided by heaters in this embodiment, improves the fabrication tolerances.

This splitter/combiner can be used in various configurations, with multiple splitter/combiners coupled to the external system, as described in the previous embodiments, or as an individual splitter/combiner, such as for 50/50 splitting and combining operations, as described in the parent application. For example, the splitter/combiner 100 shown in FIG. 7 can be coupled to an external system of two waveguides, that are transmissive over the frequency range of interest, for providing a 50/50 splitting or combining operation.

Figure 8:
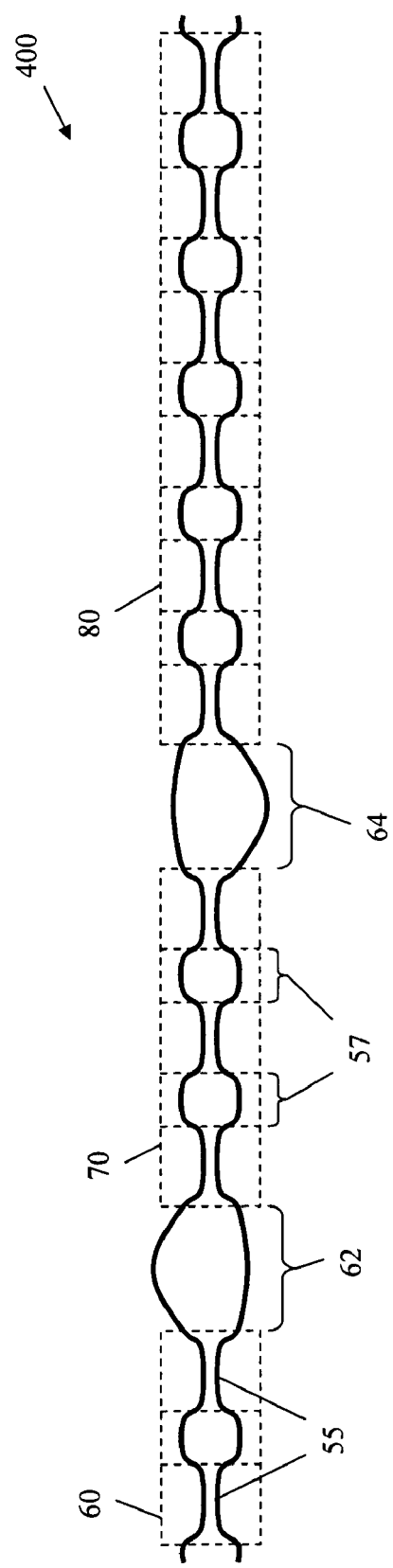
FIG. 8 is a plan view of a splitter/combiner with three subdivided couplers.

In another exemplary embodiment, directional couplers in a sequence of directional couplers and phase shifts are subdivided into identical smaller directional couplers separated by 0° phase shifts. Preferably the directional couplers are divided into a lowest common denominator coupler. For example, a splitter/combiner 400 comprising a 33.3% coupler 60, coupled to a 50% coupler 70 by a first phase shift 62, and further coupled to a 100% coupler 80 by a second phase shift 64 can be subdivided into a series of identical 16.7% directional couplers 55, as shown in FIG. 8. The 33.3% coupler is subdivided into two 16.7% directional couplers, the 50% coupler is subdivided into three 16.7% directional couplers, and the 100% coupler is subdivided into six 16.7% directional couplers. In each coupler, the 16.7% directional couplers are separated by 0° phase shifts 57. This simplifies the design because one 16.7% coupler is designed and optimized and used for all three couplers 60, 70, 80.

Although the present invention has been shown and described with respect to several preferred embodiments thereof, various changes, omissions and additions to the form and detail thereof, may be made therein, without departing from the spirit and scope of the invention.

What is claimed is:

1. A method of increasing the tolerance to fabrication variation of an optical splitter/combiner comprising at least two directional couplers and at least one phase shift, said method comprising:

subdividing said directional couplers into at least three substantially identical couplers;

providing at least one zero-degree phase shift between at least two said substantially identical couplers.

2. The method of claim 1, wherein said at least two directional couplers are subdivided into a lower common denominator directional coupler.

3. The method of claim 1 further comprising providing substantially identical fabrication variations of the coupling coefficients of at least two substantially identical directional couplers.

4. The method of claim 1, wherein said splitter/combiner is fabricated in a planar waveguide system with semiconductor lithographic fabrication tools.

5. The method of claim 1, wherein the propagation constant of at least one phase shift is tunable.

6. The method of claim 1 further comprising modifying said propagation constant using a thermo-optical method in a post-fabrication step.

7. The method of claim 1 further comprising serially connecting said directional couplers to a frequency selective element.

8. The method of claim 7, wherein said frequency selective element comprises a grating.

9. The method of claim 8, wherein said frequency selective element comprises a resonant filter.

* * * * *